United States Patent
Jeong (10) Patent No.: US 9,360,691 B2
(45) Date of Patent: Jun. 7, 2016

(54) DISPLAY SUBSTRATE AND METHOD OF REPAIRING THE SAME

(71) Applicant: SAMSUNG DISPLAY CO., LTD., Yongin, Gyeonggi-Do (KR)

(72) Inventor: Jin-Tae Jeong, Suson-si (KR)

(73) Assignee: SAMSUNG DISPLAY CO., LTD., Yongin, Gyeonggi-do (KR)

( * ) Notice: Subject to any disclaimer, the term of this patent is extended or adjusted under 35 U.S.C. 154(b) by 45 days.

(21) Appl. No.: 14/526,747

(22) Filed: Oct. 29, 2014

(65) Prior Publication Data

US 2015/0241718 A1  Aug. 27, 2015

(30) Foreign Application Priority Data

Feb. 24, 2014  (KR) .......... 10-2014-0021052

(51) Int. Cl.
| | | |
|---|---|---|
| *H01L 27/10* | (2006.01) | |
| *G02F 1/13* | (2006.01) | |
| *G02F 1/1343* | (2006.01) | |
| *G02F 1/1362* | (2006.01) | |

(52) U.S. Cl.
CPC ........ *G02F 1/1309* (2013.01); *G02F 1/134336* (2013.01); *G02F 1/136259* (2013.01)

(58) Field of Classification Search
CPC ............ G02F 1/1309; G02F 1/134336; G02F 1/136259; G02F 2001/136263; G02F 2001/136268; G02F 2001/136272

See application file for complete search history.

(56) References Cited

U.S. PATENT DOCUMENTS

| | | | |
|---|---|---|---|
| 2006/0124966 A1* | 6/2006 | Oh ......... | G02F 1/1309 257/202 |
| 2007/0139607 A1 | 6/2007 | Nam et al. | |
| 2007/0222727 A1 | 9/2007 | Baek et al. | |
| 2008/0068364 A1 | 3/2008 | Park et al. | |
| 2009/0284679 A1* | 11/2009 | Kim ....... | G02F 1/1309 349/54 |
| 2013/0215354 A1* | 8/2013 | Yoon ...... | G02F 1/1309 349/46 |

FOREIGN PATENT DOCUMENTS

| | | |
|---|---|---|
| KR | 10-2005-0067859 A | 7/2005 |
| KR | 10-2007-0065617 A | 6/2007 |
| KR | 10-2007-0091915 A | 9/2007 |
| KR | 10-2008-0024278 A | 3/2008 |
| KR | 10-2013-0019578 A | 2/2013 |

* cited by examiner

*Primary Examiner* — Tracie Y Green
(74) *Attorney, Agent, or Firm* — Lee & Morse, P.C.

(57) ABSTRACT

A method of repairing a display substrate includes electrically separating a defective pixel circuit from a pixel electrode and irradiating a laser beam on first and second intersection regions. The laser beam is irradiated on the first intersection region to weld a pixel connection part to a first repair line. The pixel connection part is connected to the pixel electrode at the first intersection region, and intersects the first repair line. The first repair line includes a first welding hole at the first intersection region. The laser beam is irradiated on the second intersection region to weld a dummy connection part of a dummy circuit to a second repair line. The second repair line intersects the dummy connection part at the second intersection region, and is separated from the pixel circuit. The second repair line includes a second welding hole at the second intersection region.

20 Claims, 7 Drawing Sheets

DISPLAY SUBSTRATE AND METHOD OF REPAIRING THE SAME

CROSS-REFERENCE TO RELATED APPLICATION

Korean Patent Application No. 10-2014-0021052, filed on Feb. 24, 2014, and entitled: "Display Substrate and Method of Repairing the Same," is incorporated by reference herein in its entirety.

BACKGROUND

1. Technical Field

One or more embodiments described herein relate to a display and method of repairing the same.

2. Description of the Related Art

Flat panel displays have low power consumption and clear image quality. In order to meet the demand for a high-definition, wide-screen displays, attempts have been made to reduce the size of the pixel circuits of these panels, while increasing the number of pixel circuits. However, the pixel circuits are easily damaged by external and/or other conditions, which causes them to operate in a defective manner.

SUMMARY

In accordance with one embodiment, a display substrate includes a substrate; a plurality of pixel circuits on the substrate; a plurality of pixel electrodes, each of the pixel electrodes connected to a respective one of the pixel circuits via a pixel connection part; a plurality of dummy circuits on the substrate, each of the dummy circuits separated from the pixel circuits and including a dummy connection part; and a repair line on the substrate, wherein the repair line intersects the pixel connection part at a first intersection region, wherein the repair line intersects the dummy connection part at a second intersection region, and wherein the repair line includes a first welding hole at the first intersection region and a second welding hole at the second intersection region.

A defective pixel circuit of the pixel circuits may be electrically separated from a corresponding one of the pixel electrodes, a substitution dummy circuit of the dummy circuits may be electrically connected to the repair line, and the repair line may be electrically connected to the corresponding one of the pixel electrodes. The repair line may be under the pixel connection part and the dummy connection part of corresponding ones of the pixel electrodes and dummy circuits.

The first insulating layer may be configured to insulate the repair line from the pixel connection part at the first intersection region of the corresponding one of the pixel electrodes and to fill the first welding hole; and a second insulating layer may be configured to insulate the repair line from the dummy connection part at the second intersection region of the corresponding one of the dummy circuits and to fill the second welding hole.

The first insulating layer may be in a melted state, and the pixel connection part of the corresponding one of the pixel electrodes may penetrates the first insulating layer to contact the repair line, and the second insulating layer may be in a melted state, and the dummy connection part of the corresponding one of the dummy circuits may penetrate the second insulating layer to contact the repair line.

The repair line may include a first extension part at the first intersection region, the first extension part extending an area of the repair line; and a second extension part at the second intersection region, the second extension part extending the area of the repair line. Each of the first extension part and the second extension part may have a concavo-convex shape when viewed from a bottom of the substrate. The repair line may include a third welding hole at the first intersection region; and a fourth welding hole at the second intersection region.

The substrate may include a laser blocking layer under the repair line, wherein the laser blocking layer includes an opening to expose the first intersection region and the second intersection region.

In accordance with another embodiment, a method of repairing a display substrate includes electrically separating a defective pixel circuit from a pixel electrode, the pixel circuit disposed on a substrate; irradiating a laser beam on a first intersection region to weld a pixel connection part to a first repair line, wherein the first repair line intersects the pixel connection part electrically connected to the pixel electrode at the first intersection region, the first repair line including a first welding hole at the first intersection region; and irradiating the laser beam on a second intersection region to weld a dummy connection part of a dummy circuit to a second repair line, wherein the second repair line intersects the dummy connection part at the second intersection region, wherein the dummy circuit is separated from the pixel circuit, and wherein the second repair line includes a second welding hole at the second intersection region.

The defective pixel circuit may be electrically separated from the pixel electrode by the laser beam irradiated on the pixel connection part. The laser beam may be irradiated on a bottom of the substrate toward a top of the substrate. The first repair line may be insulated from the pixel connection part by a first insulating layer between the first repair line and the pixel connection part, and the second repair line may be insulated from the dummy connection part by a second insulating layer between the second repair line and the dummy connection part.

The laser beam may be irradiated along a boundary line of the first welding hole and a boundary line of the first intersection region, the first insulating layer may be melted by the laser beam, and the pixel connection part may penetrate the first insulating layer to contact the first repair line.

The laser beam may be irradiated along a boundary line of the second welding hole and a boundary line of the second intersection region, the second insulating layer may be melted by the laser beam, and the dummy connection part may penetrate the second insulating layer to contact the second repair line.

The first repair line may include a first extension part at the first intersection region, the first extension part extending an area of the first repair line, and the second repair line may include a second extension part at the second intersection region, the second extension part extending an area of the second repair line. The laser beam may be irradiated along a boundary line of the first welding hole, a boundary line of the first intersection region, and a boundary line of the first extension part, the first insulating layer may be melted by the laser beam, and the pixel connection part may penetrate the first insulating layer to contact the first repair line.

The laser beam may be irradiated along a boundary line of the second welding hole, a boundary line of the second intersection region, and a boundary line of the second extension part, the second insulating layer may be melted by the laser beam, and the dummy connection part may penetrate the second insulating layer to contact the second repair line.

Each of the first extension part and the second extension part may have a concavo-convex shape when viewed from a bottom of the substrate. The laser beam may be irradiated on an opening of a laser blocking layer under the first repair line and the second repair line, the opening to expose the first intersection region and the second intersection region.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 1:
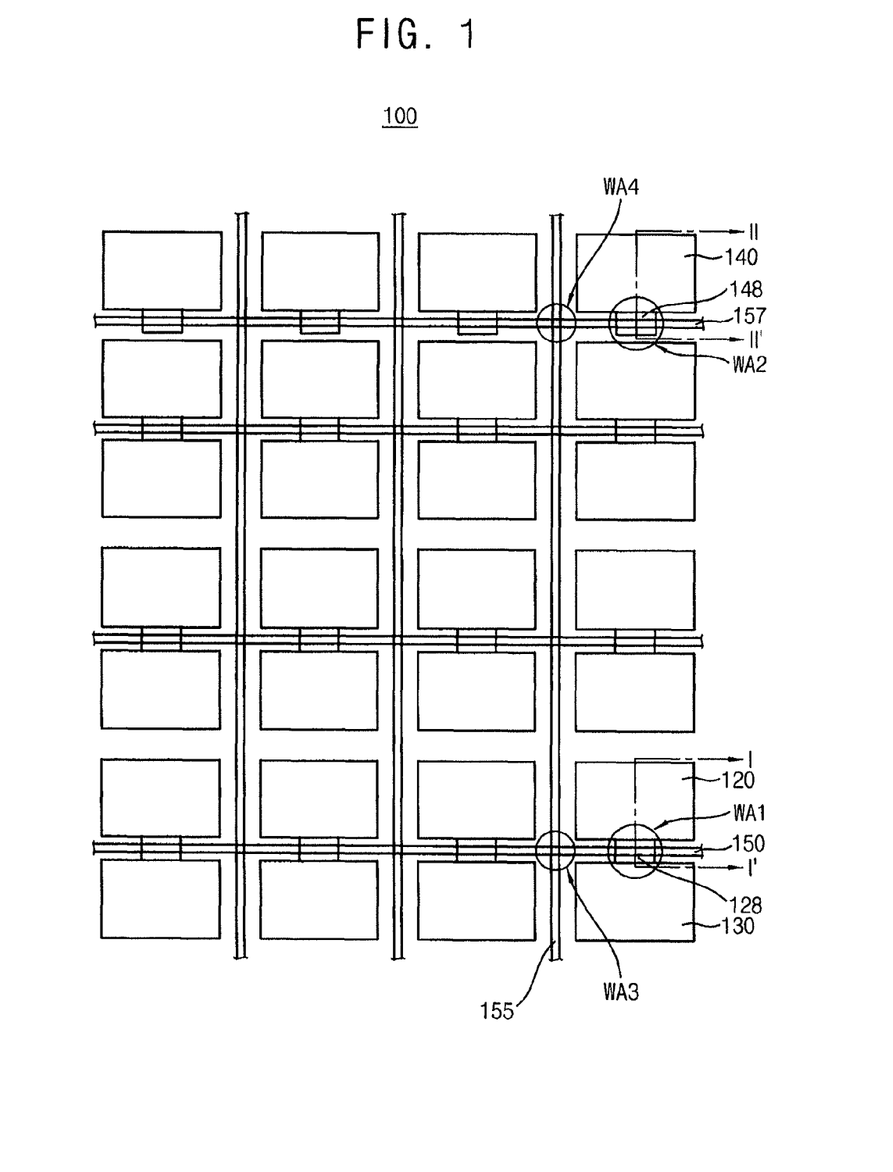
FIG. 1 illustrates an embodiment of a display substrate.
Figure 2:
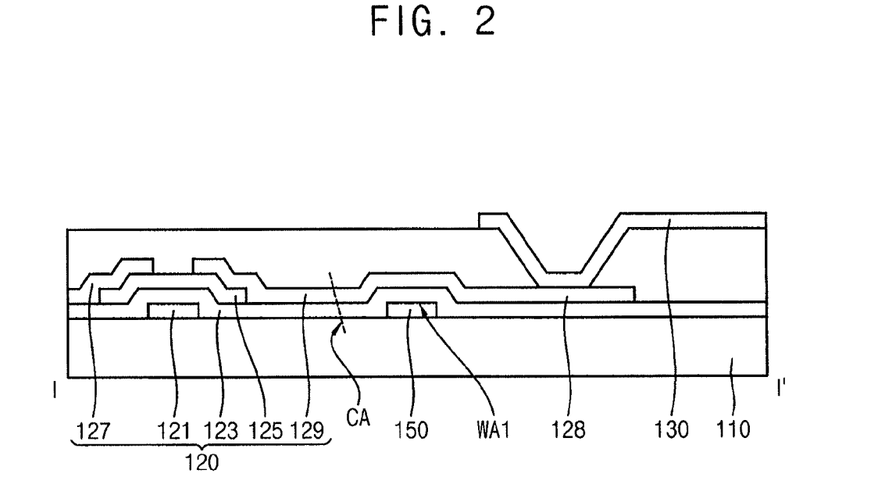
FIG. 2 illustrates a view taken along section line I-I' in FIG. 1.
Figure 3:
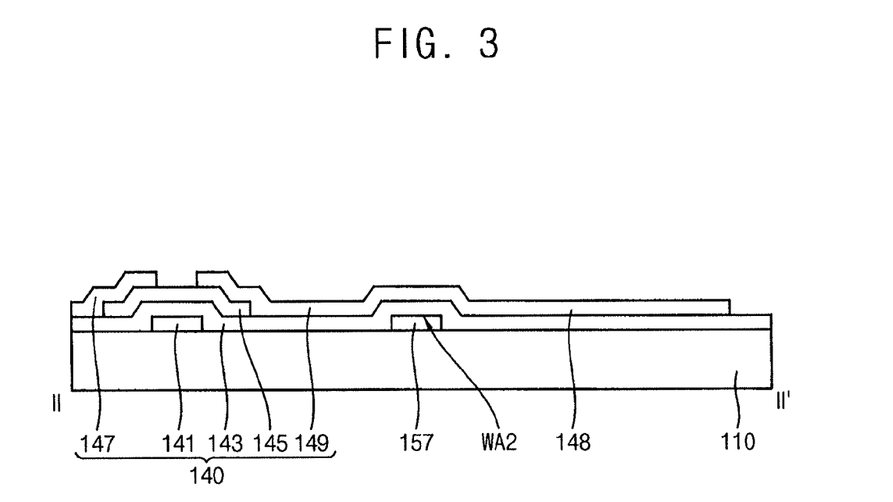
FIG. 3 illustrates a view taken along section line II-II' in FIG. 1.
Figure 4:
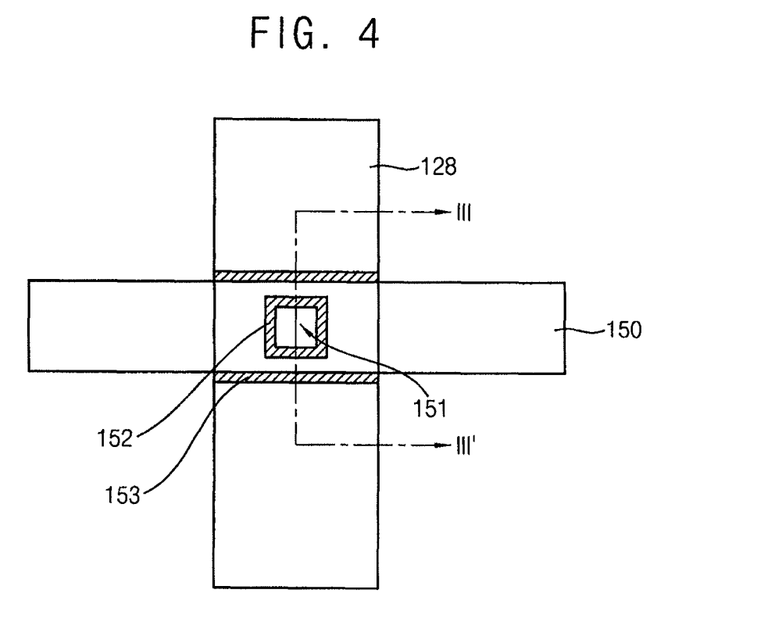
FIG. 4 illustrates an example of a repair line in the display substrate of FIG. 1.
Figure 5A:
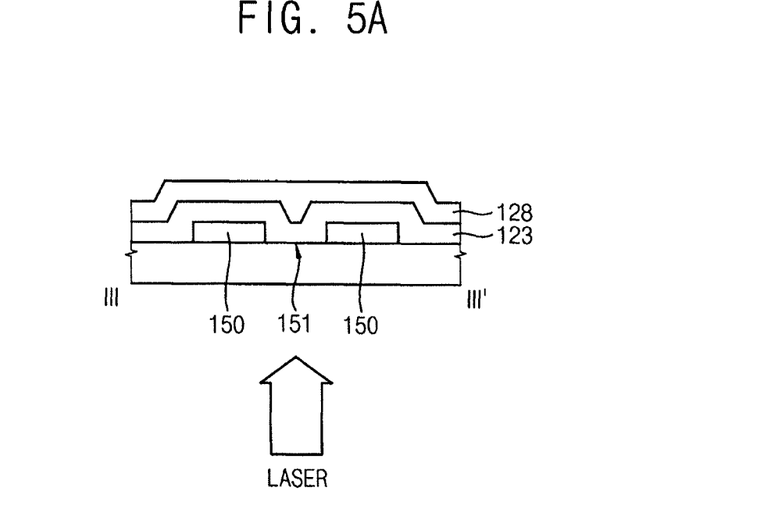
FIGS. 5A and 5B illustrate cross-sectional views of a process for welding a repair line in FIG. 4 to a pixel connection part.
Figure 5B:
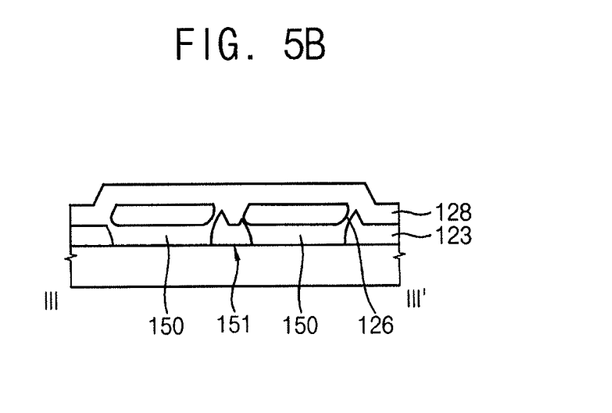

FIG. 1 illustrates an embodiment of a display substrate. FIG. 2 illustrates a cross-sectional view taken along a line I-I' of the display substrate in FIG. 1. FIG. 3 illustrates a cross-sectional view taken along a line II-II' of the display substrate in FIG. 1. FIG. 4 illustrates an example of a repair line in the display substrate in FIG. 1. FIGS. 5A and 5B are cross-sectional views corresponding to a process for welding the repair line in FIG. 4 to a pixel connection part, by a laser welding.

Referring to FIGS. 1 through 5B, the display substrate 100 includes a substrate 110, a pixel circuit 120, a dummy circuit 140, a pixel electrode 130, and a plurality of repair lines 150, 155, and 157.

The display substrate 100 may be a substrate for a display panel. For example, the display substrate 100 may be applied to a liquid crystal display panel or an organic light emitting display panel. In an example embodiment, when the display substrate 100 is applied to an organic light emitting display panel, an organic light emitting layer may be disposed on the pixel electrode 130. When the display substrate 100 is applied to a liquid crystal display panel, a liquid crystal may be disposed, for example, on the pixel electrode 130.

The substrate 110 may support the pixel circuit 120, the dummy circuit 140, the pixel electrode 130, and the repair lines 150, 155, and 157. The substrate 110 may be, for example, a glass substrate or a plastic substrate to maintain a physical toughness and a chemical stability. If the substrate 110 is the glass substrate, the substrate 110 may include silicon oxide (SiOx). If the substrate 110 is the plastic substrate, the substrate 110 may include, for example, polyacrylate (PAR), polyetherimide (PEI), polyethylen terephthalate (PET), polyethylen naphthalate (PEN), polyphenylene sulfide (PPS), and/or Polyimide, polycarbonate (PC).

The pixel circuit 120 may be on the substrate 110 and electrically connected to the pixel electrode 130 via a pixel connection part 128. The pixel circuit 120 may include a switching element transmitting an electrical signal to the pixel electrode 130. For example, the switching element may be a thin film transistor (TFT). For convenience of description, the thin film transistor is illustrated in FIG. 2 as the pixel circuit 120.

In one embodiment, the pixel circuit 120 may include a gate electrode 121, a gate insulation layer 123 covering the gate electrode 121, a semiconductor layer 125 overlapping the gate electrode and disposed on the gate insulation layer 123, and a source electrode 127 and a drain electrode 129 that contact the semiconductor layer 125.

The gate electrode 121 may form a channel at the semiconductor layer 125 based on a gate voltage, and may turn-on or turn-off the thin film transistor. The gate electrode 121 may include, for example, a metal, a conductive metal nitride, a conductive metal oxide, or a transparent conductive material.

The gate insulation layer 123 may cover the gate electrode 121 and may insulate the gate electrode 121 from the semiconductor layer 125. The gate insulation layer 123 may include, for example, an oxide or an organic insulating material.

The semiconductor layer 125 may disposed on the gate insulation layer 123 and may overlap the gate electrode 121. When the gate voltage is applied to the gate electrode 121, the channel may be formed in the semiconductor layer 125 and an electrical signal may be transmitted from the source electrode 127 to the drain electrode 129. The semiconductor layer 125 may include, e.g., polysilicon, polysilicon having impurity, an amorphous silicon, an amorphous silicon having impurity, an oxide silicon, or an oxide silicon having impurity.

The source electrode 127 and the drain electrode 129 may be electrically connected to the semiconductor layer 125. For example, the source electrode 127 and the drain electrode 129 may contacted respective sides of the semiconductor layer 125. Each of the source electrode 127 and the drain electrode 129 may include, for example, a metal, a conductive metal nitride, a conductive metal oxide, or a transparent conductive material.

The pixel connection part 128 may be electrically connected to the drain electrode 129 of the pixel circuit 120. For example, the pixel connection part 128 may be connected to the drain electrode 129 in a single conductive layer. Further, the pixel connection part 128 may be electrically connected to the pixel electrode 130. For example, the pixel connection part 128 may directly contact the pixel electrode 130. Thus, the electrical signal may be transmitted to the pixel electrode 130 via the source electrode 127, the drain electrode 129 of the pixel circuit 120, and the pixel connection part 128.

The pixel connection part 128 may include the same material as that of the drain electrode 129 of the pixel circuit 120. For example, the pixel connection part 128 may include, for example, a metal, a conductive metal nitride, a conductive metal oxide, or a transparent conductive material. The pixel connection part 128 may be formed to have a single-layer structure or multi-layer structure.

The pixel electrode 130 may drive a pixel based on the electrical signal input from the pixel connection part 128. For example, when the display substrate 100 is applied to an organic light emitting display panel, the pixel electrode 130 may drive the organic light emitting layer to emit light. When the display substrate 100 is applied to a liquid crystal display panel, the pixel electrode 130 may affect an arrangement of liquid crystals.

The pixel electrode 130 may be located in a pixel region formed by the pixels, and may be arranged in a predetermined pattern. The pixel electrode 130 may include, for example, a metal (e.g., aluminum (Al), silver (Ag), gold (Au), platinum (Pt), chromium (Cr), tungsten (W), molybdenum (Mo), titanium (Ti), palladium (Pd) or an alloy thereof), a transparent conductive material (e.g., indium tin oxide (ITO), indium zinc oxide (IZO), aluminum zinc oxide (AZO), tin oxide (SnOx), indium oxide (InOx), and/or gallium oxide (GaOx), etc.). The pixel electrode 130 may have a single-layer structure or multi-layer structure.

The dummy circuit 140 may be separated from the pixel circuit 120. The dummy circuit 140 may be substituted for a defective pixel circuit. The dummy circuit 140 may consistently transmit the electrical signal to the pixel electrode 130 as a substitute for the defective pixel circuit. For example, the defective pixel circuit may be generated during a manufacturing process for the display panel, or the pixel circuit may be damaged by an external environment (e.g., electrostatic electricity). The defective pixel circuit (i.e., damaged pixel circuit) may not transmit the electrical signal to the pixel electrode 130, or transmit a defective signal to the pixel electrode 130. Accordingly, the pixel may malfunction by the defective pixel circuit.

To solve this problem, the defective pixel circuit may be cut from the pixel electrode 130, for example, by a laser cutting. If the pixel circuit 120 is the defective pixel circuit as illustrated in FIG. 2, a laser beam may be irradiated to a connection region CA, at which the drain electrode 129 is connected to the pixel connection part 128. The drain electrode 129 may be cut from the pixel connection part 128 by the laser beam.

A cut pixel circuit 120 may be substituted for the dummy circuit 140. The dummy circuit 140 may be connected to the pixel connection part 128, and may transmit the electrical signal to the pixel electrode 130 consistently. In this way, the defective pixel circuit 120 may be repaired. The dummy circuit 140 may have substantially the same circuit features as pixel circuit 120. For example, the dummy circuit 140 may include a thin film transistor. For convenience of description, the thin film transistor is illustrated in FIG. 3 as the dummy circuit 140.

In one embodiment, the dummy circuit 140 may include a dummy gate electrode 141, a dummy gate insulation layer 143 covering the dummy gate electrode 141, a dummy semiconductor layer 145 overlapping dummy gate electrode 141 and disposed on the dummy gate insulation layer 143, and a dummy source electrode 147 and a dummy drain electrode 149 which contact the dummy semiconductor layer 145.

The dummy gate electrode 141, the dummy gate insulation layer 143, the dummy semiconductor layer 145, the dummy source electrode 147, and the dummy drain electrode 149 of the dummy circuit 140 may be substantially same as the gate electrode 121, the gate insulation layer 123, the semiconductor layer 125, the source electrode 127, and the drain electrode 129 of the pixel circuit 120, respectively.

A dummy connection part 148 may be electrically connected to the dummy drain electrode 149 of the dummy circuit 140. For example, as illustrated in FIG. 3, the dummy connection part 148 may be connected to the dummy drain electrode 149 in a single conductive layer. The dummy connection part 148 may include the same material as the dummy drain electrode 149 of the dummy circuit 140. For example, the dummy connection part 148 may include, for example, a metal, a conductive metal nitride, a conductive metal oxide, or a transparent conductive material. The dummy connection part 148 may have a single-layer structure or multi-layer structure.

The repair lines 150, 155, and 157 may electrically connect the pixel electrode 130 to the dummy circuit 140. The repair lines 150, 155, and 157 may include a plurality of lines intersecting each other. For example, the repair line 150, 155, and 157 may include horizontal repair lines 150 and 157 arranged in a horizontal direction, and a vertical repair line 155 arranged in a vertical direction. The horizontal repair lines 150 and 157 may include a repair line 150 intersecting the pixel connection part 128 and a repair line 157 intersecting with the dummy connection part 148. For illustrative purposes, the repair line 150 which intersects the pixel connection part 128 is defined as a first repair line 150, the repair line 157 intersecting the dummy connection part 148 is defined as a second repair line 157, and the repair line 155 arranged in the vertical direction is defined as a third repair line 155.

In one embodiment, the first repair line 150, the second repair line 157, and the third repair line 155 may be separated from each other. For example, the first repair line 150, the second repair line 157, and the third repair line 155 may be disposed in different layers that are separated from each other. In another embodiment, the first repair line 150, the second repair line 157, and the third repair line 155 may be formed in one line on the same layer.

The repair lines 150, 155, and 157 may be electrically connected to the pixel connection part 128 and the dummy connection part 148, for example, by laser welding. For example, the first repair line 150 may be welded to the pixel connection part 128 by irradiating a laser beam on a first intersection region WA1, at which the first repair line 150 intersects the pixel connection part 128. The second repair line 157 may be welded to the dummy connection part 148 by irradiating the laser beam on a second intersection region WA2, at which the second repair line 157 intersects the dummy connection part 148. The third repair line 155 may be welded to the first repair line 150 by irradiating the laser beam on a third intersection region WA3, at which the third repair line 155 intersects the first repair line 150. Furthermore, the third repair line 155 may be welded to the second repair line 157 by irradiating the laser beam on a fourth intersection region WA4, at which the third repair line 155 intersects the second repair line 157.

Accordingly, the dummy circuit 140 may be electrically connected to the pixel electrode 130 via the dummy connection part 148, the second repair line 157 welded to the dummy connection part 148, the third repair line 155 welded to the second repair line 157, the first repair line 150 welded to the third repair line 155, and the pixel connection part 128 welded to the first repair line 150.

In one embodiment, the laser beam may be irradiated on a bottom of the substrate 110 toward a top of the substrate 110. If the laser beam is irradiated on the top of the substrate 110 toward the bottom of the substrate 110, the laser may not reach the repair lines 150, 155, and 157 as a result of being blocked by other elements on the top of the substrate 110.

For example, when the pixel electrode 130 includes metal, the pixel electrode 130 may serve as a reflective electrode. Accordingly, the laser beam may be reflected by the pixel electrode 130, and therefore may not reach the repair lines 150, 155, and 157. However, when the laser beam is irradiated on the bottom of the substrate 110 toward the top of the substrate 110, the laser beam may easily reach the repair lines 150, 155, and 157 on the bottom of the substrate 110. Accordingly, the repair lines 150, 155, and 157 may be easily welded to the pixel connection part 128 and the dummy connection part 148.

The repair lines 150, 155, and 157 may be insulated from the pixel connection part 128 and the dummy connection part 148. For example, as illustrated in FIG. 2, a first insulating layer 123 may be disposed between the first repair line 150 and the pixel connection part 128, to insulate the first repair line 150 from the pixel connection part 128. For example, the first insulating layer 123 may serve as the gate insulation layer 123. The gate electrode 121 and the first repair line 150 may be disposed on the same layer, and the gate insulation layer 123 (e.g., the first insulating layer) may cover the gate electrode 121 and the first repair line 150.

Further, as illustrated in FIG. 3, a second insulating layer 143 may be disposed between the second repair line 157 and the dummy connection part 148, to insulate the second repair line 157 from the dummy connection part 148. For example, the second insulating layer 143 may serve as the dummy gate insulation layer 143. The dummy gate electrode 141 and the second repair line 157 are disposed on the same layer, and the dummy gate insulation layer 143 (e.g., the second insulating layer) may cover the dummy gate electrode 141 and the second repair line 157.

Further, a third insulating layer may be disposed between the first repair line 150 and the third repair line 155, to insulate the first repair line 150 from the third repair line 155. A fourth insulating layer may be disposed between the second repair line 157 and the third repair line 155, to insulate the second repair line 157 from the third repair line 155. The insulating layers 123 and 143 may include, for example, an oxide or an organic insulating material. For example, the insulating layers 123 and 143 may include, for example, silicon oxide (SiOx), hafnium oxide (HfOx), aluminum oxide (AlOx), zirconium oxide (ZrOx), titanium oxide (TiOx), tantalum oxide (TaOx), a benzocyclobutene (BCB)-based resin, or an acryl-based resin.

In one embodiment, the repair lines 150, 155, and 157 may be under the pixel connection part 128 and the dummy connection part 148. For example, as illustrated in FIG. 2, the pixel connection part 128 may intersect with the first repair line 150 at the first intersection region WA1. Further, as illustrated in FIG. 3, the dummy connection part 148 may intersect the second repair line 157 at the second intersection region WA2. In example embodiments, the repair lines 150, 155, and 157 may include, for example, a metal, a conductive metal nitride, a conductive metal oxide, or a transparent conductive material, to easily transmit the electrical signal from the dummy circuit 140 to the pixel electrode 130. The repair lines 150, 155, and 157 may have a single-layer structure or multi-layer structure.

In one embodiment, as illustrated in FIG. 4, each of the repair lines 150, 155, and 157 may include at least one welding hole 151. The repair lines 150, 155, and 157 may be easily welded by the welding hole 151. For example, when the first repair line 150 is welded to the pixel connection part 128, as illustrated in FIG. 5A, the laser beam is irradiated on the bottom of the substrate 110. The first insulating layer 123 and the pixel connection part 128 on the first insulating layer 123 may be melted by energy of the laser beam.

A melted pixel connection part 128 may flow down through the melted first insulating layer 123. The melted pixel connection part 128 may contact the first repair line 150, as illustrated in FIG. 5B. A part of the first insulating layer 123 under a boundary region 153 of the first intersection region WA1 may be easily melted. However, other parts of the first insulating layer 123 may not melt despite the laser welding. This may prevent the first repair line 150 from being welded to the pixel connection part 128.

To solve this problem, the repair lines 150, 155, and 157 may include at least one welding hole 151. The welding hole 151 may expose the first insulating layer 123 or the second insulating layer 143. The laser may easily reach the first insulating layer 123 or the second insulating layer 143 via the welding hole 151. For example, as illustrated in FIG. 4, the first insulating layer 123 may easily melt at not only the boundary region 153 of the first intersection region WA1, but also a boundary region 152 of the welding hole 151. Accordingly, the repair lines 150, 155, and 157 may easily be welded to the pixel connection part 128 and the dummy connection part 148. Thus, a probability of success for the laser welding may be increased.

The pixel connection part 128 may penetrate the first insulating layer 123 melted at the boundary region 153 of the first intersection region WA1 and the boundary region 152 of the welding hole 151, so that the pixel connection part 128 may contact the first repair line 150. Thus, the pixel connection part 128 may contact the first repair line 150 at not only the boundary region 153 of the first intersection region WA1, but also the boundary region 152 of the welding hole 151. Therefore, the number of welding points 126 at which the pixel connection part 128 contact the first repair line 150 may be increased.

The welding hole 151 may be disposed at each of the intersection regions WA1, WA2, WA3, and WA4 of the repair lines 150, 155, and 157. For example, as illustrated in FIG. 4, a first welding hole 151 may be disposed at the first intersection region WA1, at which the first repair line 150 intersects the pixel connection part 128. A second welding hole may be disposed at the second intersection region WA2, at which the second repair line 157 intersects the dummy connection part 148.

Further, a welding hole may be disposed at the third intersection region WA3, at which the first repair line 150 intersects the third repair line 155, and the fourth intersection region WA4 at which the second repair line 157 intersects the third repair line 155. For example, when the first repair line 150, the second repair line 155, and the third repair line 157 are formed in one line, the welding hole 151 may be disposed at the first intersection region WA1 at which the repair line 150, 155, and 157 intersects the pixel connection part 128 and the second intersection region WA2 at which the repair line 150, 155, and 157 intersects the dummy connection part 148, respectively.

The welding hole 151 may have various shapes and sizes. For example, the welding hole 151 may have a polygonal shape, a circular shape, or an elliptical shape. Further, as illustrated in FIG. 4, the welding hole 151 may have a smaller size than a width of the repair lines 150, 155, and 157.

As described above, the display substrate 100 may include the dummy circuit 140 that may be substituted for a defective pixel circuit. Also, the repair lines 150, 155, and 157 may be connect the dummy circuit 140 to a pixel electrode 130. The repair lines 150, 155, and 157 may include the welding hole 151. The repair lines 150, 155 and 157 may be easily welded to respective ones of the dummy circuit 140 and the pixel electrode 130, by irradiating a laser beam on the welding hole 151. Therefore, the dummy circuit 140 may be easily connected to the pixel electrode 130, and the defective pixel circuit of the display substrate 100 may be easily repaired. Accordingly, the display substrate 100 may have improved reliability.

Figure 6:
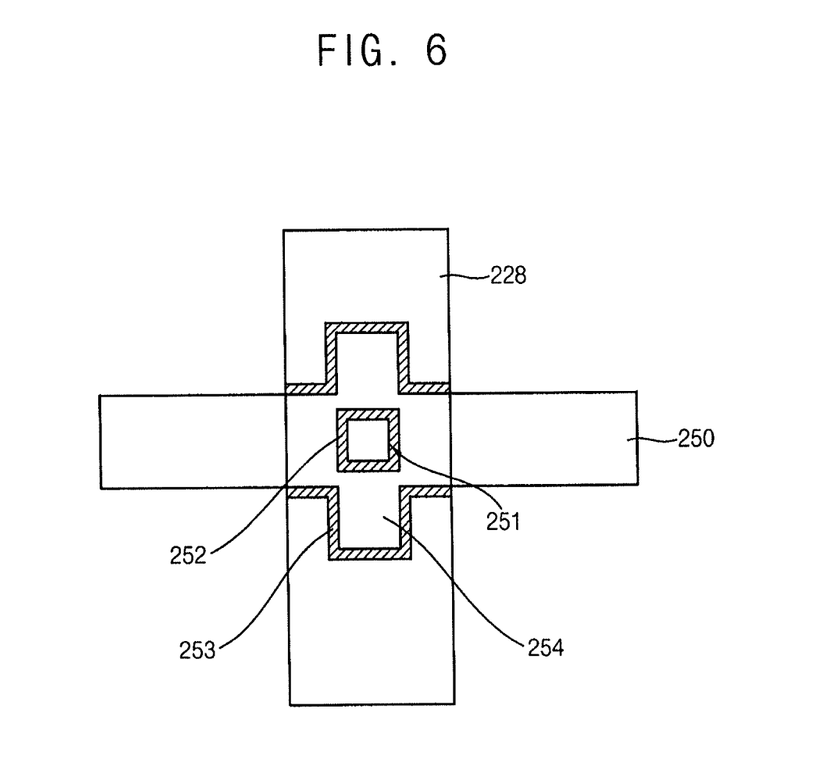
FIG. 6 illustrates another example of a repair line in FIG. 1.

FIG. 6 illustrates another example of a repair line in the display substrate of FIG. 1. Referring to FIG. 6, the repair line 250 may include a welding hole 251 and an extension part 254. All elements of the repair line 250, except the extension part 254 in the repair line 250, may be substantially same as the repair lines 150, 155, and 157 in FIGS. 1 through 5B.

The extension part 254 may extend at one or more intersection regions at which the repair line 250 intersects the pixel connection part 228 (or the dummy connection part). As illustrated in FIG. 6, the extension part 254 may be disposed at respective intersection regions at which the repair line 250 intersects the pixel connection part 228 (or the dummy connection part). An area of the respective intersection regions may be extended by the extension part 254.

As described above, laser welding may be performed at the respective intersection regions, and an insulating layer between the repair line 250 and the pixel connection part 228 (or the dummy connection part) may be melted by the laser beam. The pixel connection part 228 (or the dummy connection part) may penetrate the melted insulating layer, so that the pixel connection part 228 may contact the repair line 250. The insulating layer may be easily melted at a boundary region 253 of the respective intersection region. Because the extension part 254 extends an area of the boundary region 253 of the respective intersection regions, the insulating layer may easily melt at the extended boundary region 253. Accordingly, a probability of success for the laser welding is increased.

For example, the insulating layer may be easily melted at a boundary region 252 of the welding hole 251 and at the boundary region 253 of the intersection region extended by the extension part 254. The pixel connection part 228 (or the dummy connection part) may penetrate the melted insulating layer, so that the pixel connection part 228 may be easily welded to the repair line 250.

In one embodiment, the extension part 254 may be disposed at respective intersection regions of the repair line 250. For example, a first extension part 254 may be disposed at a first intersection region, at which a first repair line 250 intersects the pixel connection part 228. A second extension part may be disposed at a second intersection region, at which a second repair line intersects the dummy connection part. Extension parts may be respectively disposed at a third intersection region, at which the first repair line 250 intersects a third repair line, and at a fourth intersection region at which the second repair line intersects the third repair line.

In one embodiment, when the first repair line 250, the second repair line, and the third repair line are formed in one line, the welding hole 251 and the extension part 254 may be respectively disposed at a first intersection region, at which the repair line 250 intersects the pixel connection part 228, and at a second intersection region at which the repair line 250 intersects the dummy connection part. The extension part 254 may have various shapes and sizes. For example, the extension part 254 may have a protrusion shape as illustrated in FIG. 6, so that the area of the intersection region may be extended.

As described above, the display substrate according to one embodiment includes the dummy circuit that may be substituted for the defective pixel circuit, and the repair line 250 that may connect the dummy circuit to a pixel electrode. The repair line 250 may include the welding hole 251 and the extension part 254. The repair line 250 may be easily welded, respectively, to the dummy circuit and the pixel electrode by a laser beam irradiated on the boundary region 252 of the welding hole 251 and the boundary region 253 of the extension part 254. Therefore, the dummy circuit may be easily connected to the pixel electrode, and the defective pixel circuit of the display substrate may be easily repaired. Accordingly, the display substrate may have improved reliability.

Figure 7:
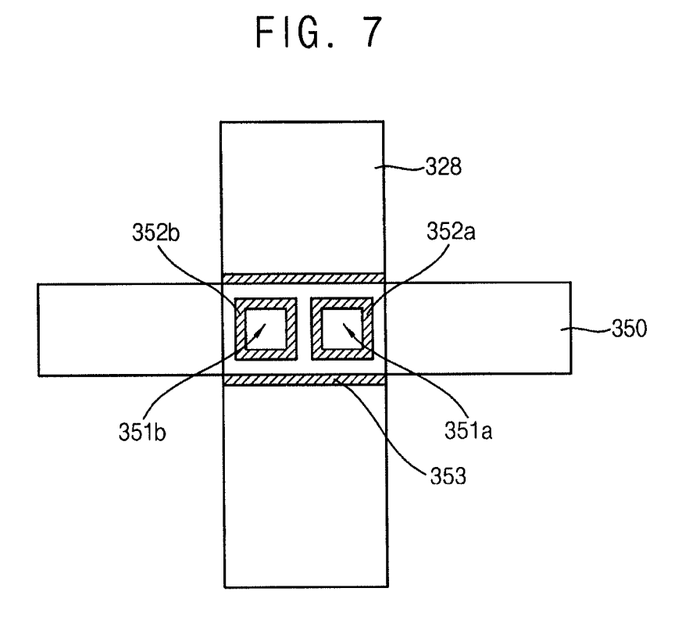
FIG. 7 illustrates another example of a repair line in FIG. 1.

FIG. 7 illustrates another example of a repair line in the display substrate of FIG. 1. Referring to FIG. 7, the repair line 350 may include two welding holes 351a and 351b separated from each other. All elements of the repair line 350, except two welding holes 351a and 351b, may be substantially same as the repair lines 150, 155, and 157 of FIGS. 1 through 5B.

In one embodiment, the repair line 350 may include a plurality of welding holes 351a and 351b. As described above, the repair line 350 may be easily welded to a pixel connection part 328 and a dummy connection part by a laser beam irradiated on the welding holes 351a and 351b. Thus, if the number of the welding holes 351a and 351b is increased, the repair line 350 may be more easily welded.

The welding holes 351a and 351b may expose an insulating layer between the repair line 350 and the pixel connection part 328 (or the dummy connection part). The laser beam may easily reach the insulating layer through the welding holes 351a and 351b. Thus, the insulating layer may be easily melted by the laser beam, and the probability of success for laser welding may be increased.

For example, part of the insulating layer under a first boundary region 352a of a first welding hole 351a and another part of the insulating layer under a third boundary region 352b of a third welding hole 351b may be easily melted by the laser beam. Further, the other part of the insulating layer under a boundary region 353 of a first intersection region, at which a first repair line 350 intersects the pixel connection part 328, may be easily melted by the laser beam. The pixel connection part 328 may penetrate the melted insulating layer to contact the first repair line 350.

In one embodiment, the welding holes 351a and 351b may be disposed at respective intersection regions of the repair line 350. For example, the first welding hole 351a and the third welding hole 351b may be disposed at the first intersection region, at which the first repair line 350 intersects the pixel connection part 328. The second welding hole and the fourth welding hole may be disposed at a second intersection region, at which a second repair line intersects the dummy connection part. Further, a plurality of welding holes may be disposed respectively at a third intersection region, at which the first repair line 350 intersects a third repair line, and a fourth intersection region at which the second repair line intersects the third repair line.

In one embodiment, when the first repair line 350, the second repair line, and the third repair line are formed in one line, the welding holes 351a and 351b may be disposed respectively at a first intersection region, at which the repair line 350 intersects the pixel connection part 328, and at a second intersection region at which the repair line 350 intersects the dummy connection part. The welding holes 351a and 351b may have a various shapes and sizes.

As described above, the display substrate according to one embodiment may include the dummy circuit that may be substituted for the defective pixel circuit, and the repair line that may connect the dummy circuit to a pixel electrode. The repair line 350 may include a plurality of welding holes 351a and 351b. The repair line 350 may be easily welded respectively to the dummy circuit and the pixel electrode by a laser beam irradiated on the boundary regions 352a and 352b of the welding holes 351a and 351b. Therefore, the dummy circuit may be easily connected to the pixel electrode, and the defective pixel circuit of the display substrate is easily repaired. Accordingly, the display substrate may have improved reliability.

Figure 8:
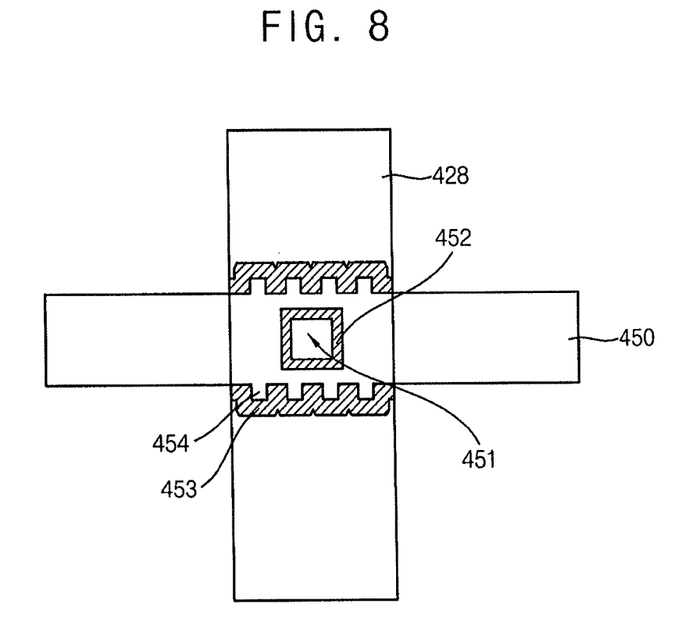
FIG. 8 illustrates another example of a repair line in FIG. 1.

FIG. 8 illustrates another example of a repair line in the display substrate of FIG. 1. Referring to FIG. 8, the repair line 450 may include a welding hole 451 and a plurality of extension parts 454. All elements of the repair line 450, except the extension parts 454, may be substantially same as the repair line 250 of FIG. 6.

The extension parts 454 may extend an area of respective intersection regions at which the repair line 450 intersects a pixel connection part 428 (or a dummy connection part). As illustrated in FIG. 8, the extension parts 454 may be disposed at the respective intersection regions, at which the repair line 450 intersects the pixel connection part 428 (or the dummy connection part). An area of the respective intersection regions may be extended by the extension parts 454.

As described above, laser welding may be performed at the respective intersection regions, and an insulating layer between the repair line 450 and the pixel connection part 428 (or the dummy connection part) may be easily melted by the laser. The pixel connection part 428 (or the dummy connection part) may penetrate the melted insulating layer, so that the pixel connection part 428 (or the dummy connection part) may contacted the repair line 450. The insulating layer may be easily melted at a boundary region 453 of the respective intersection regions. Because the extension parts 454 extend an area of the boundary region 453 of the respective intersection regions, the insulating layer may be easily melted at the extended boundary region 453. Accordingly, the probability of success for the laser welding is increased.

For example, the insulating layer may be easily melted at a boundary region 452 of the welding hole 451 and at the boundary region 453 of the intersection region extended by the extension parts 454. The pixel connection part 428 (or the dummy connection part) may penetrate the melted insulating layer, so that the pixel connection part 428 may be easily welded to the repair line 450.

In one embodiment, the extension parts 454 may be disposed at the respective intersection regions of the repair line 450. For example, first extension parts 454 may be disposed at a first intersection region, at which a first repair line 450 intersects the pixel connection part 428. Second extension parts may be disposed at a second intersection region, at which a second repair line intersects the dummy connection part. Further, a plurality of extension parts may be disposed respectively at a third intersection region, at which the first repair line 450 intersects a third repair line, and at a fourth intersection region at which the second repair line intersects the third repair line.

In one embodiment, when the first repair line 450, the second repair line, and the third repair line are formed in one line, the welding hole 451 and the extension parts 454 may be disposed respectively at a first intersection region, at which the repair line 450 intersects the pixel connection part 428, and at a second intersection region at which the repair line 450 intersects the dummy connection part.

The extension parts 454 may have various shapes and sizes. For example, the extension parts 454 may have a protrusion shape as illustrated in FIG. 8. The extension parts 454 may have a concavo-convex shape from a bottom view of the substrate, so that the area of the intersection region may be extended to a greater extent, and the repair line 450 may be more easily welded to the pixel electrode.

As described above, the display substrate according to one embodiment may include a dummy circuit that may be substituted for a defective pixel circuit, and a repair line 450 that may connect the dummy circuit to a pixel electrode. The repair line 450 may include the welding hole 451 and a plurality of extension parts 454. The repair line 450 may be easily welded respectively to the dummy circuit and the pixel electrode by a laser beam irradiated on the boundary region 452 of the welding hole 451 and the boundary region 453 of the extension parts 454. Therefore, the dummy circuit may be easily connected to the pixel electrode, and the defective pixel circuit of the display substrate may be easily repaired. Accordingly, the display substrate may have improved reliability.

Figure 9:
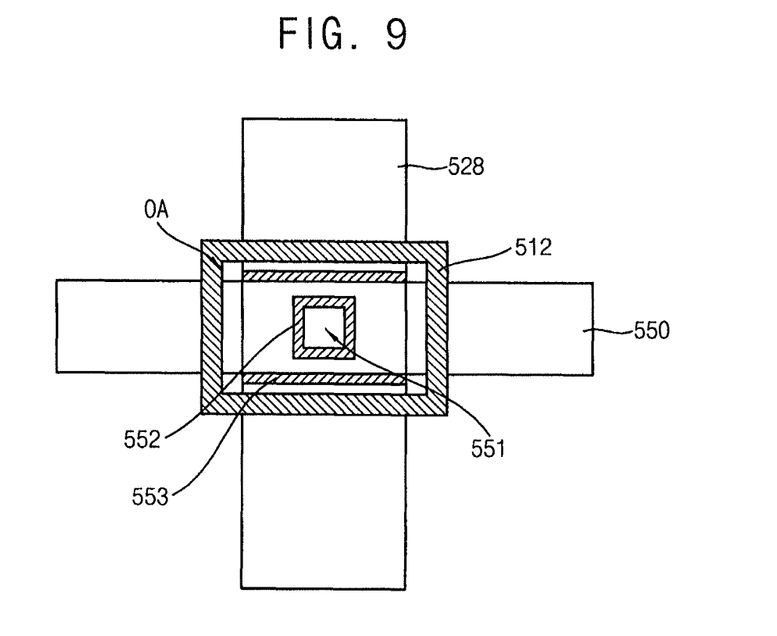
FIG. 9 illustrates another embodiment of a display substrate.
Figure 10:
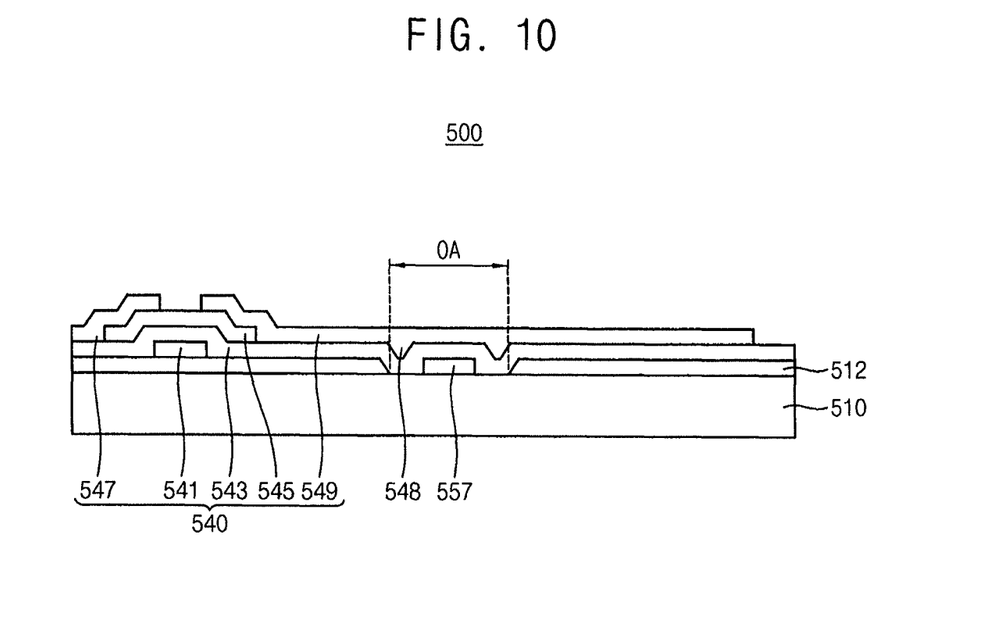
FIG. 10 illustrates a cross-sectional view of a repair line and a dummy circuit in FIG. 9.

FIG. 9 illustrates another embodiment of a display substrate 500, and FIG. 10 is a cross-sectional view of a repair line and a dummy circuit in FIG. 9. Referring to FIGS. 9 and 10, the display substrate 500 includes a pixel circuit, a dummy circuit 540, a pixel electrode, repair lines 550 and 557, and a laser blocking layer 512. All elements of the display substrate 500, except the laser blocking layer 512, may be substantially same as the display substrate 100 of FIGS. 1 through 5B.

The laser blocking layer 512 may block a laser incident to all regions, except an intersection region at which the repair lines 550 and 557 intersect a pixel connection part 528 (or a dummy connection part 548). The laser used in laser welding may adversely affect elements disposed on a substrate 510 under some circumstances. For example, a laser beam irradiated on a bottom of the substrate 510 may adversely affect the dummy circuit 540. The dummy circuit 540 may be damaged by the laser beam.

In one embodiment, to prevent the dummy circuit 540 from damage, a laser beam having low energy may be irradiated on the bottom of the substrate 510, and the repair lines 550 and 557 may be welded by the low energy laser beam. Accordingly, the repair lines 550 and 557 may not be welded to a pixel electrode and the dummy circuit 540 by the low energy laser beam.

However, when the laser blocking layer 512 is under the dummy circuit 540, as illustrated in FIG. 10, a laser beam incident on the dummy circuit 540 may be blocked by the laser blocking layer 512. Accordingly, the dummy circuit 540 may be protected during a laser welding process, and a high energy laser may be used in the laser welding process to weld the repair lines 550 and 557. Thus, the repair line 550 and 557 may be strongly welded to the pixel electrode and the dummy circuit 540, and the probability of success for laser welding may be increased.

In one embodiment, the laser blocking layer 512 may be under the repair lines 550 and 557. Because the laser beam is irradiated on the bottom of the substrate 510 toward the top of the substrate 510, the laser blocking layer 512 may be disposed near the bottom of the substrate 510 to effectively block the laser. Thus, the laser blocking layer 512 may be under the repair lines 550 and 557, the pixel connection part 528, and the dummy connection part 548 as illustrated in FIG. 9.

In one embodiment, the laser blocking layer 512 may absorb or reflect the laser beam. Accordingly, the laser blocking layer 512 may include, for example, an organic material, a metal, or another material that is able to absorb or reflect the laser beam. For example, the laser blocking layer 512 may include an opaque organic material or an opaque metal (e.g., molybdenum, chromium, tantalum(Ta), titanium).

In one embodiment, the laser blocking layer 512 may include an opening OA exposing the intersection region. A laser beam may be irradiated on the intersection region via the opening OA. Because the opening OA exposes the repair lines 550 and 557, the repair lines 550 and 557 in the opening OA may be shown to be disposed at substantially the same layer (or level) as the laser blocking layer 512 as illustrated in FIG. 10.

However, the repair lines 550 and 557, in all regions except the opening OA, may be disposed on an upper surface of the laser blocking layer 512. Although the repair lines 550 and 557 are shown to be disposed at the same layer (or level) as the laser blocking layer 512 in FIG. 10, the repair lines 550 and 557 may be disposed on the upper surface of the laser blocking layer 512 in other embodiments.

In one embodiment, the opening OA may be disposed at the intersection region at which the repair lines 550 and 557 intersects the pixel connection part 528 (or the dummy connection part 548). For example, a first opening OA may be disposed at a first intersection region, at which a first repair line 550 intersects the pixel connection part 528, and a second opening OA may be disposed at a second intersection region at which a second repair line 557 intersects the dummy connection part 548.

Further, an opening may be disposed respectively at a third intersection region, at which the first repair line 550 intersects a third repair line, and at a fourth intersection region at which the second repair line 557 intersects the third repair line. The opening OA may have various shapes and sizes. For example, as illustrated in FIG. 9, the opening OA may have a polygonal shape exposing the intersection region at which the repair lines 550 and 557 intersect the pixel connection part 528 (or the dummy connection part 548), from a bottom view of the substrate 510.

As described above, the display substrate 500 may include the dummy circuit 540 that may be substituted for the defective pixel circuit, the repair lines 550 and 557 that may connect the dummy circuit 540 to a pixel electrode, and the laser blocking layer 512 blocking the laser incident to all regions except the intersection region at which the repair lines 550 and 557 intersect the pixel connection part 528 (or the dummy connection part 548). The laser blocking layer 512 may protect the dummy circuit 540 from the damage induced by the laser, and the repair lines 550 and 557 may be strongly welded respectively to the dummy circuit 540 and the pixel electrode by the high energy laser. Therefore, the dummy circuit 540 may be easily and strongly connected to the pixel electrode, and the defective pixel circuit of the display substrate may be easily repaired. Accordingly, the display substrate 500 may have improved reliability.

Figure 11:
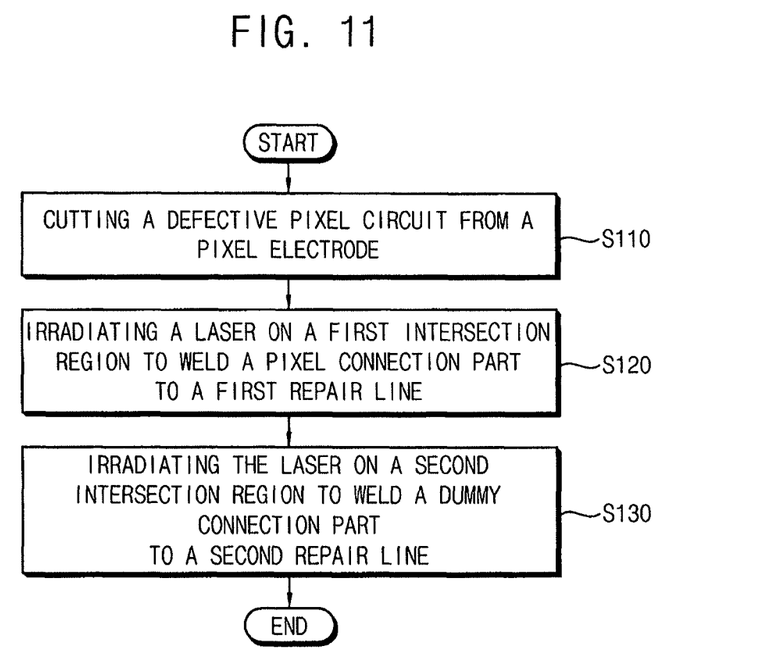
FIG. 11 illustrates an embodiment of a method for repairing a display substrate.

FIG. 11 illustrates an embodiment of a method for repairing a display substrate. The method includes electrically cutting a defective pixel circuit of a plurality of pixel circuits from a pixel electrode (S110), irradiating a laser beam on a first intersection region to weld a pixel connection part to a first repair line (S120), and irradiating a laser beam on a second intersection region to weld a dummy connection part to a second repair line (S130). The display substrate repaired by the method of FIG. 11 may be substantially same as the display substrate 100 of FIGS. 1 through 5B.

The method of FIG. 11 may cut a defective pixel circuit 120 of the pixel circuits that are disposed on the substrate 110 from the pixel electrode 130. For example, the method of FIG. 11 may irradiate a laser beam on a connection region CA, at which the pixel electrode 130 is connected to a drain electrode 129 of the defective pixel circuit 120, so that the pixel electrode 130 may be cut from the defective pixel circuit 120. A pixel connection part 128 or the drain electrode 129 at the connection region CA may be partially melted, so that the pixel connection part 128 may be separated from the drain electrode 129.

The method of FIG. 11 may irradiate the laser beam on the first intersection region WA1 to weld the first repair line 150 to the pixel connection part 128. The method of FIG. 11 may irradiate the laser beam on the second intersection region WA2 to weld the second repair line 157 to the dummy connection part 148. The repair lines 150, 155, and 157 may include a plurality of lines intersecting each other. For example, the repair lines 150, 155, and 157 may include the first repair line 150 arranged in a horizontal direction to intersect the pixel connection part 128 at the first intersection region WA1. The second repair line 157 may be arranged in a horizontal direction to intersect the dummy connection part 148 at the second intersection region WA2. A third repair line 155 may be arranged in a vertical direction to intersect the first repair line 150 at a third intersection region WA3 and to intersect the second repair line 157 at a fourth intersection region WA4.

In one embodiment, the first repair line 150, the second repair line 157, and the third repair line 155 may be separated from each other. For example, the first repair line 150, the second repair line 157, and the third repair line 155 may be disposed on different layers, respectively, as different lines separated from each other.

In one embodiment, the first repair line 150, the second repair line 157, and the third repair line 155 may be formed in one line on the same layer.

In one embodiment, each of the repair lines 150, 155, and 157 may include at least one welding hole 151. For example, the first repair line 150 may include a first welding hole 151 at the first intersection region WA1. The second repair line 157 may include a second welding hole at the second intersection region WA2. The third repair line 155 may include a third welding hole at the third intersection region WA3 and a fourth welding hole at the fourth intersection region WA4.

In one embodiment, insulating layers 123 and 143 may be between the repair lines 150, 155, and 157 and the pixel connection part 128 (or the dummy connection part 148). For example, a first insulating layer 123 may be between the first repair line 150 and the pixel connection part 128. A second insulating layer 143 may be between the second repair line 157 and the dummy connection part 148. The insulating layers 123 and 143 may fill the welding hole 151, and insulate the repair lines 150, 155, and 157 from the pixel connection part 128 (or the dummy connection part 148).

In one embodiment, the method of FIG. 11 may irradiate the laser beam on the first intersection region WA1 and weld the first repair line 150 to the pixel connection part 128. For example, the laser beam may be irradiated on a bottom of the substrate 110 toward a top of the substrate 110. The first insulating layer 123 may be melted by the laser beam. The pixel connection part 128 may be flow down through the melted first insulating layer 123, so that the pixel connection part 128 may contact the first repair line 150. The first insulating layer 123 may be easily melted at a boundary region 152 of the first welding hole 151, and a boundary region 153 of the first intersection region WA1 at which the first repair line 150 intersects the pixel connection part 128. Thus, the first repair line 150 may be easily welded to the pixel connection part 128 at the boundary region 152 of the first welding hole 151 and the boundary region 153 of the first intersection region WA1. The laser beam may be irradiated along the boundary regions 152 and 153, respectively.

In one embodiment, the method of FIG. 11 may irradiate the laser beam on the second intersection region WA2 and weld the second repair line 157 to the dummy connection part 148. For example, the laser beam may be irradiated on the bottom of the substrate 110 toward the top of the substrate 110. The second insulating layer 143 may be melted by the laser beam. The dummy connection part 148 may flow down through the melted second insulating layer 143, so that the dummy connection part 148 may contact the second repair line 157. The second insulating layer 143 may be easily melted at a boundary region of the second welding hole, and a boundary region of the second intersection region WA2 at which the second repair line 157 intersects the dummy connection part 148. Thus, the second repair line 157 may be easily welded to the dummy connection part 148 at the boundary region of the second welding hole and the boundary region of the second intersection region WA2. The laser beam may be irradiated along the boundary regions, respectively.

In one embodiment, the repair lines 150, 155, and 157 may include an extension part extending an area of the intersection regions WA1, WA2, WA3, and WA4. For example, the first repair line 150 may include a first extension part at the first intersection region WA1, the second repair line 157 may include a second extension part at the second intersection region WA2, and the third repair line 155 may include a third extension part at the third intersection region WA3 and a fourth extension part at the fourth intersection region WA4.

The extension part may have a concavo-convex shape from a bottom view of the substrate 110, and may protrude from the repair lines 150, 155, and 157. The laser beam may be irradiated along a boundary region of the extension part, the boundary region of the intersection regions WA1, WA2, WA3, and WA4, and the boundary region of the welding hole 151. For example, the laser beam may be irradiated along a boundary region of the first intersection region WA1, and a boundary region of the first extension part. Further, the laser beam may be irradiated along a boundary region 152 of the first welding hole 151.

The pixel connection part 128 may contact the first repair line 150 at the boundary region of the first intersection region WA1, the first extension part, and the first welding hole 151. For example, the laser beam may be irradiated along a boundary region of the second intersection region WA2 and a boundary region of the second extension part. Further, the laser beam may be irradiated along a boundary region of the second welding hole. The dummy connection part 148 may contact the second repair line 157 at the boundary region of the second intersection region WA2, the second extension part, and the second welding hole. As a result, the probability of success for the laser welding may be increased.

In one embodiment, the display substrate 100 may include a laser blocking layer having an opening that exposes respective intersection regions WA1, WA2, WA3, and WA4. The laser blocking layer may be under the repair lines 150, 155, and 157. The laser blocking layer may block the laser beam by absorbing or reflecting the laser at a peripheral region, except the intersection regions WA1, WA2, WA3, and WA4. Because the laser beam incident to the peripheral region is blocked by the laser blocking layer, the laser beam may be irradiated on the intersection region WA1, WA2, WA3, and WA4 exposed by the opening. Thus, the laser blocking layer may protect the dummy circuit 140 from damage induced by the laser beam. As a result, the display substrate 100 including the laser blocking layer may be repaired by a high energy laser beam. Accordingly, the repair lines 150, 155, and 157 may be strongly welded to the pixel connection part 128 and the dummy connection part 148.

The pixel electrode 130 may be electrically connected to the dummy circuit 140 via the pixel connection part 128, the repair lines 150, 155, and 157 welded to the pixel connection part 128, and the dummy connection part 148 welded to the repair lines 150, 155, and 157 by the method of FIG. 11. Therefore, the pixel circuit 120 may be cut from the pixel electrode 130, and the pixel electrode 130 may be consistently provided with an electrical signal from the dummy circuit 140 substituted for the defective pixel circuit 120.

Further, because the repair lines 150, 155, and 157 include the welding hole 151 and/or the extension part, the repair lines 150, 155, and 157 may be easily welded to the pixel connection part 128 and the dummy connection part 148.

Further, the laser welding may be performed using a high energy laser when the display substrate 100 includes the laser blocking layer, that blocks the laser at the peripheral region except the intersection region WA1, WA2, WA3, and WA4. Thus, the repair lines 150, 155, and 157 may be strongly welded to the pixel connection part 128 and the dummy connection part 148 by the high energy laser.

By way of summation and review, a display substrate in the related art includes a dummy circuit and a repair line. The dummy circuit may be substituted for a defective pixel circuit, and the repair line may connect the dummy circuit to a pixel electrode. The repair line may be welded to a connection part by the laser welding, in order to connect the dummy circuit to the pixel electrode. However, a laser beam may not reach to the connection part (e.g., pixel electrode), which prevents the repair line from being easily welded.

In accordance with one or more of the aforementioned embodiments, a display substrate includes a dummy circuit and a repair line having a welding hole and/or an extension part. With this structure, a laser beam can easily reach the connection part through the welding hole. Further, because the extension part extends an area of an intersection region, welding region can also be extended. Thus, the repair line may be easily welded to the connection part, and the defective pixel circuit can be easily repaired.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise indicated. Accordingly, it will be understood by those of skill in the art that various changes in form and details may be made without departing from the spirit and scope of the present invention as set forth in the following claims.

What is claimed is:

1. A display substrate, comprising:
 a substrate;
 a plurality of pixel circuits on the substrate;
 a plurality of pixel electrodes, each of the pixel electrodes connected to a respective one of the pixel circuits via a pixel connection part;
 a plurality of dummy circuits on the substrate, each of the dummy circuits separated from the pixel circuits and including a dummy connection part; and
 a repair line on the substrate, wherein the repair line intersects the pixel connection part at a first intersection region, wherein the repair line intersects the dummy connection part at a second intersection region, and wherein the repair line includes a first welding hole at the first intersection region and a second welding hole at the second intersection region.

2. The substrate as claimed in claim 1, wherein:
a defective pixel circuit of the pixel circuits is electrically separated from a corresponding one of the pixel electrodes,
a substitution dummy circuit of the dummy circuits is electrically connected to the repair line, and
the repair line is electrically connected to the corresponding one of the pixel electrodes.

3. The substrate as claimed in claim 2, wherein the repair line is under the pixel connection part and the dummy connection part of corresponding ones of the pixel electrodes and dummy circuits.

4. The substrate as claimed in claim 3, further comprising:
a first insulating layer configured to insulate the repair line from the pixel connection part at the first intersection region of the corresponding one of the pixel electrodes and to fill the first welding hole; and
a second insulating layer configured to insulate the repair line from the dummy connection part at the second intersection region of the corresponding one of the dummy circuits and to fill the second welding hole.

5. The substrate as claimed in claim 4, wherein:
the first insulating layer is in a melted state, and the pixel connection part of the corresponding one of the pixel electrodes penetrates the first insulating layer to contact the repair line, and
the second insulating layer is in a melted state, and the dummy connection part of the corresponding one of the dummy circuits penetrates the second insulating layer to contact the repair line.

6. The substrate as claimed in claim 5, wherein the repair line includes:
a first extension part at the first intersection region, the first extension part extending an area of the repair line; and
a second extension part at the second intersection region, the second extension part extending the area of the repair line.

7. The substrate as claimed in claim 6, wherein each of the first extension part and the second extension part have a concavo-convex shape when viewed from a bottom of the substrate.

8. The substrate as claimed in claim 5, wherein the repair line includes:
a third welding hole at the first intersection region; and
a fourth welding hole at the second intersection region.

9. The substrate as claimed in claim 5, further comprising:
a laser blocking layer under the repair line,
wherein the laser blocking layer includes an opening to expose the first intersection region and the second intersection region.

10. A method of repairing a display substrate, the method comprising:
electrically separating a defective pixel circuit from a pixel electrode, the pixel circuit disposed on a substrate;
irradiating a laser beam on a first intersection region to weld a pixel connection part to a first repair line, wherein the first repair line intersects the pixel connection part electrically connected to the pixel electrode at the first intersection region, the first repair line including a first welding hole at the first intersection region; and
irradiating the laser beam on a second intersection region to weld a dummy connection part of a dummy circuit to a second repair line, wherein the second repair line intersects the dummy connection part at the second intersection region, wherein the dummy circuit is separated from the pixel circuit, and wherein the second repair line includes a second welding hole at the second intersection region.

11. The method as claimed in claim 10, wherein the defective pixel circuit is electrically separated from the pixel electrode by the laser beam irradiated on the pixel connection part.

12. The method as claimed in claim 10, wherein the laser beam is irradiated on a bottom of the substrate toward a top of the substrate.

13. The method as claimed in claim 12, wherein:
the first repair line is insulated from the pixel connection part by a first insulating layer between the first repair line and the pixel connection part, and
the second repair line is insulated from the dummy connection part by a second insulating layer between the second repair line and the dummy connection part.

14. The method as claimed in claim 13, wherein:
the laser beam is irradiated along a boundary line of the first welding hole and a boundary line of the first intersection region,
the first insulating layer is melted by the laser beam, and
the pixel connection part penetrates the first insulating layer to contact the first repair line.

15. The method as claimed in claim 13, wherein:
the laser beam is irradiated along a boundary line of the second welding hole and a boundary line of the second intersection region,
the second insulating layer is melted by the laser beam, and
the dummy connection part penetrates the second insulating layer to contact the second repair line.

16. The method as claimed in claim 13, wherein the first repair line includes:
a first extension part at the first intersection region, the first extension part extending an area of the first repair line, and
the second repair line includes a second extension part at the second intersection region, the second extension part extending an area of the second repair line.

17. The method as claimed in claim 16, wherein:
the laser beam is irradiated along a boundary line of the first welding hole, a boundary line of the first intersection region, and a boundary line of the first extension part,
the first insulating layer is melted by the laser beam, and
the pixel connection part penetrates the first insulating layer to contact the first repair line.

18. The method as claimed in claim 16, wherein:
the laser beam is irradiated along a boundary line of the second welding hole, a boundary line of the second intersection region, and a boundary line of the second extension part,
the second insulating layer is melted by the laser beam, and
the dummy connection part penetrates the second insulating layer to contact the second repair line.

19. The method as claimed in claim 16, wherein each of the first extension part and the second extension part have a concavo-convex shape when viewed from a bottom of the substrate.

20. The method as claimed in claim 13, wherein the laser beam is irradiated on an opening of a laser blocking layer under the first repair line and the second repair line, the opening to expose the first intersection region and the second intersection region.

* * * * *